United States Patent
Moon et al.

(10) Patent No.: US 11,727,047 B2
(45) Date of Patent: Aug. 15, 2023

(54) SYSTEM FOR RECOMMENDING CONTENT

(71) Applicant: Samsung Electronics Co., Ltd, Suwon-si (KR)

(72) Inventors: Jong Chae Moon, Seoul (KR); Soh Min Ahn, Yongin-si (KR); Young Chan Woo, Suwon-si (KR); Guk Ho Gil, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 880 days.

(21) Appl. No.: 16/470,192

(22) PCT Filed: Dec. 7, 2017

(86) PCT No.: PCT/KR2017/014333
§ 371 (c)(1),
(2) Date: Jun. 14, 2019

(87) PCT Pub. No.: WO2018/110900
PCT Pub. Date: Jun. 21, 2018

(65) Prior Publication Data
US 2020/0019563 A1    Jan. 16, 2020

(30) Foreign Application Priority Data
Dec. 16, 2016 (KR) .......... 10-2016-0172662

(51) Int. Cl.
*G06F 16/435* (2019.01)
*G06F 16/45* (2019.01)
(Continued)

(52) U.S. Cl.
CPC .......... *G06F 16/437* (2019.01); *G06F 16/156* (2019.01); *G06F 16/438* (2019.01);
(Continued)

(58) Field of Classification Search
CPC .... G06F 16/437; G06F 16/156; G06F 16/438; G06F 16/45; G06F 3/0482; G06F 3/12;
(Continued)

(56) References Cited

U.S. PATENT DOCUMENTS 7,386,547 B2    6/2008 Grasso et al.
7,440,943 B2    10/2008 Grasso et al.
(Continued)

FOREIGN PATENT DOCUMENTS

JP    2002278989 A    9/2002
JP    2004-287624 A   10/2004
(Continued)

OTHER PUBLICATIONS

International Search Report dated Mar. 22, 2018 in connection with International Patent Application No. PCT/KR2017/014333, 2 pages.
(Continued)

*Primary Examiner* — Shewaye Gelagay
*Assistant Examiner* — Carlton Johnson

(57) ABSTRACT

According to an embodiment, a system includes an electronic device, a server, and an output device. The electronic device may perform user authentication together with the server. The server may specify first content based on the user authentication and may transmit first metadata of the first content to the electronic device. The electronic device may visually output a first object representing the first content based on the first metadata, and transmit, when at least one object is selected of the output objects by the user, identification information of content represented by the selected object to the server. The server may output content corresponding to the identification information through the output device. Moreover, various embodiment found through the present disclosure are possible.

12 Claims, 13 Drawing Sheets

(51) Int. Cl.
*G06F 16/438* (2019.01)
*G06F 16/14* (2019.01)
*H04L 9/40* (2022.01)
*H04W 4/80* (2018.01)
*G06F 3/0482* (2013.01)

(52) U.S. Cl.
CPC .......... *G06F 16/45* (2019.01); *H04L 63/0853* (2013.01); *H04L 63/104* (2013.01); *H04L 63/105* (2013.01); *G06F 3/0482* (2013.01); *H04W 4/80* (2018.02)

(58) Field of Classification Search
CPC ...... G06F 17/00; G06F 3/1238; G06F 3/1288; H04L 63/0853; H04L 63/104; H04L 63/105; H04L 63/08; H04L 67/306; H04L 9/32; H04W 4/80; H04W 4/08; H04W 12/06; G06Q 10/10; G06Q 50/10; G06Q 10/00

See application file for complete search history.

(56) References Cited

U.S. PATENT DOCUMENTS

| | | |
|---|---|---|
| 9,007,635 B2 | 4/2015 | Torii |
| 9,116,652 B2 | 8/2015 | Yun |
| 9,250,847 B2 | 2/2016 | Yun |
| 2011/0197166 A1 | 8/2011 | Girgensohn et al. |
| 2012/0078937 A1* | 3/2012 | Hall ...................... G06F 16/435 707/786 |
| 2014/0282666 A1* | 9/2014 | Comstock ............ H04N 21/274 725/18 |
| 2015/0363140 A1 | 12/2015 | Koutrika et al. |
| 2016/0124999 A1* | 5/2016 | González Brenes . G06F 16/213 707/803 |
| 2018/0167789 A1* | 6/2018 | Tsuchida ............. H04L 67/2847 |

FOREIGN PATENT DOCUMENTS

| | | |
|---|---|---|
| JP | 2007-156915 A | 6/2007 |
| JP | 2009-301108 A | 12/2009 |
| JP | 2011-022677 A | 2/2011 |
| JP | 2013122701 A | 6/2013 |
| KR | 10-2014-0090297 A | 7/2014 |
| KR | 10-1535622 B1 | 7/2015 |

OTHER PUBLICATIONS

Korean Intellectual Property Office, "Office Action," dated Apr. 7, 2023, in connection with Korean Patent Application No. 10-2016-0172662, 23 pages.

* cited by examiner

SYSTEM FOR RECOMMENDING CONTENT

CROSS-REFERENCE TO RELATED APPLICATIONS

This application is a 371 of International Application No. PCT/KR2017/014333 filed on Dec. 7, 2017, which claims priority to Korean Patent Application No. 10-2016-0172662 filed on Dec. 16, 2016, the disclosures of which are herein incorporated by reference in their entirety.

BACKGROUND

1. Field

Embodiments disclosed in the disclosure relate to a system for recommending content.

2. Description of Related Art

As information technologies (IT) or mobile communication technologies have been developed, various types of electronic products have been developed and distributed. In particular, recently, an electronic device, such as a smartphone or a tablet PC, which has various functions, has been extensively spread. Such an electronic device is used for work in a space such as an office, a production site, a construction site, a hospital, or the like.

Meanwhile, various types of content (e.g., documents) provided for a user, a customer, a colleague, or a business partner is output through an output device (e.g., printer) in various spaces described above. For example, the user may access a network (e.g., an intranet, the Internet) using the various types of electronic devices described above, and may output desired content through a printer connected to the network.

In various business spaces described above, specified content may be frequently output in response to a business need. For example, in a hospital ward, a nurse (or doctor) may be required to provide each patient with specified documents such as hospitalization procedures, ward cautions, surgery consent, and pre-operation notes. In addition, the nurse may have to output a specified document at every predetermined period according to regulations in the hospital. Furthermore, a large business such as a general hospital may have many output devices (e.g., printers) connected to the network.

In this case, the nurse retrieves a document, which is periodically or frequently output, from an electronic device or a server DB of the nurse. However, the process of retrieving the document may slightly require complicated steps. In addition, when the nurse moves frequently in the general hospital, it is not easy for the nurse to accurately specify the printer installed nearest to the nurse using the electronic device of the nurse.

Embodiments disclosed in the disclosure are intended to solve the problems described above and the problems occurring in the disclosure. Embodiments disclosed in the disclosure provide an apparatus and a method capable of recommending the most promising document by synthetically analyzing user information of an electronic device connected to a server and/or printer information collected through various paths, and additionally recommending a document similar to or having higher association with a document selected by a user.

SUMMARY

According to an embodiment disclosed in the disclosure, a system includes an electronic device, a server, and an output device. The electronic device may perform user authentication together with the server. The server may specify first content based on the user authentication and may transmit first metadata of the first content to the electronic device. The electronic device may visually output a first object representing the first content based on the first metadata, and may transmit, when at least one object is selected from the output object by a user, identification information of content represented by the selected object to the server. The server may output the content corresponding to the identification information through the output device.

In addition, according to an embodiment disclosed in the disclosure, an electronic device may include a memory, a display, a communication circuit to establish communication with a server, and a processor electrically connected with the memory, the display, and the communication circuit. The memory may store instructions that when executed, cause the processor to provide a graphic user interface (UI) to the display, perform user authentication together with the server, receive first metadata of first content from the server, output a first object representing the first content to a first area of the graphic UI based on the first metadata, and transmit, when at least one object is selected of the output object by a user, identification information of content represented by the selected object.

According to embodiments of the disclosure, the electronic device may receive the recommendation of the first content based on the content output history of the user, the content output history of another user, and/or the content output history of the specified printer. The electronic device may further recommend, to the user, a second content that is formally or substantially similar to the content selected by the user. In addition, various effects may be provided that are directly or indirectly understood through this document.

DETAILED DESCRIPTION

Figure 1:
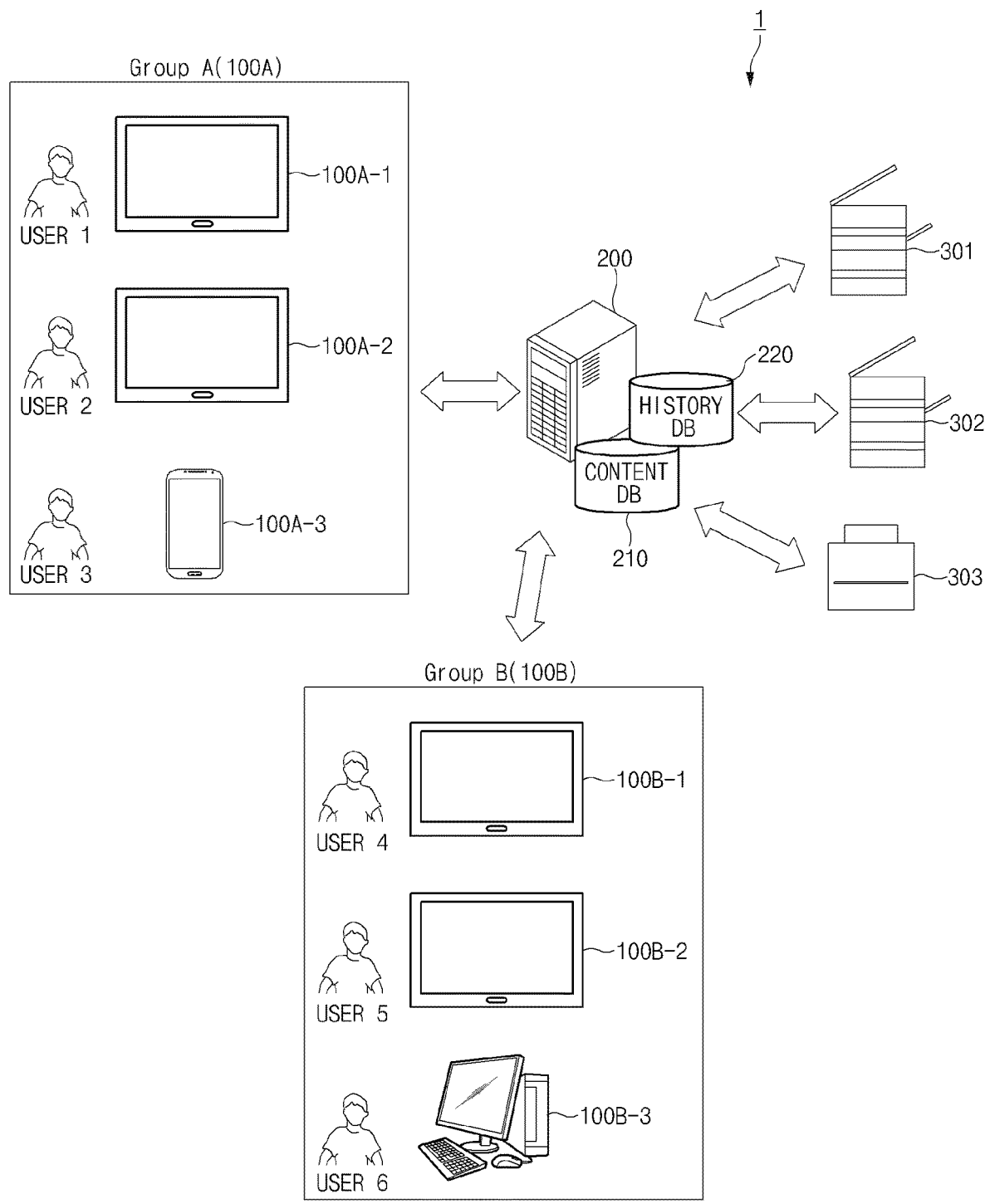
FIG. 1 illustrates a system for recommending content, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 illustrates a system for recommending content, according to an embodiment.

Referring to FIG. 1, according to an embodiment, a system 1 for recommending content may include a plurality of electronic devices 100A-1, 100A-2, and 100A-3 belonging to a group A 100A, a plurality of electronic apparatuses 100B-1, 100B-2, and 100B-3 belonging to a group B 100B, a server 200, and a plurality of output devices 301. Although not illustrated in FIG. 1, each device included in the system 1 for recommending content may make communication through a network (e.g., an intranet, the Internet, a virtual private network (VPN), or the like). Hereinafter, the system for recommending content according to an embodiment will be described in brief with reference to FIG. 1, and the more detailed description of the system for recommending content will be described with reference to FIG. 2.

According to one embodiment, the electronic devices belonging to the group A 100A and/or the group B 100B may perform user authentication (e.g., login) with the server 200. For example, the electronic devices belonging to the group A 100A and/or the group B 100B may authorize a user to access the network when an identifier (ID) and a password of the user are input. When the user authentication is successfully completed, the server 200 may identify an electronic device, for which the user authentication is completed, and a user of the electronic device.

According to one embodiment, each of the electronic devices belonging to the group A 100A and/or the group B 100B may assign any one of the output devices 301 to 303. For example, user 1 directly assigns the output device 301 by using a specified graphic UI displayed on the electronic device 100A-1, or by performing the certain interaction with the output device 301 (e.g., NFC, Bluetooth communication, QR code recognition, RFID tag recognition, and the like). The identification information of the assigned output device

301 may be transmitted to the server 200 by the electronic device 100A-1 or by the assigned output device 301. The server 200 may verify (or identify) the assigned output device 301.

According to an embodiment, when the user authentication of the user 1 is successfully completed by the electronic device 100A-1, and when the output device 301 is assigned, the server 200 may specify first content to be recommended to the user 1, based on the user authentication of the user 1 and/or the identification information of the assigned output device 301. The first content may be a single piece of content, or may include the set of multiple pieces of content.

The first content recommended for the user 1 may be specified in various manners. First, the server 200 may verify (or identify) the user 1 of the electronic device 100A-1 based on the user authentication information and verify the output device 301 based on the identification information of the output device.

According to an embodiment, the server 200 may specify the first content, based on a content output history of the user 1, a content output history of another user (i.e., user 2, user 3, or the like) belonging to a group (i.e., group A) in common with the user 1, or content output histories of other users playing roles corresponding to roles (e.g., job, position, or the like) of the user 1. The content output histories of the users may be stored in a history DB 220 of output content in the server 200. The first content may be obtained from a content DB 210 of the server 200 or may be specified as one of data stored in the content DB 210. For example, the first content may include, but not limited to, a document frequently output by the user 1, a document frequently output by user 2 belonging to the group (i.e., group A) in common with the user 1, and/or a document frequently output by a user (e.g., user 5) in another group playing the same role as that of the user 1.

According to another embodiment, the server 200 may specify the first content based on the content output history of the assigned output device 301. The content output history of the output device 301 may be stored in the history DB 220 for output content in the server 200. For example, the first content may include, but is not limited to, a document output from the output device 301 at the frequency, which is equal to or higher than a threshold value, or a document output at the relatively higher frequency.

As described above, when the first content is specified, the server 200 may transmit first metadata of the first content to the electronic device 100A-1. According to one embodiment, the first metadata may include at least one of an address, an abstract, a content access right, an accessing history, and other texts, an image, a thumbnail, or the like of the first content, in the content DB 210.

According to one embodiment, the electronic device 100A-1 may visually output a first object representing the first content based on the received first metadata. The first object may refer to a thing produced by visually realizing, on the display, various texts and images included in the first metadata.

According to one embodiment, the electronic device 100A-1 may receive a user input for selecting at least one object (hereinafter, object S) of objects output on the display of the electronic device 100A-1. In response to the user input, the electronic device 100A-1 may transmit the identification information of content S represented by the selected object S to the server 200. For example, the identification information may include the name of the content S represented by the selected object S, or an address in the content DB 210. The server 200 may retrieve, from the content DB 210, the content S corresponding to the identification information and transmit the content S to the output device 301 previously assigned. The output device 301 may output the received content S.

Meanwhile, when receiving the identification information of the content S represented by the object S selected by the user, the server 200 may specify the second content associated with the content S corresponding to the identification information. The second content may be content, which is recommended to the user, may include a single piece of content, or the set of multiple pieces of content. The second content recommended to the user 1 may be specified in various manners.

According to one embodiment, the server 200 may designate, as the second content, content having a output history based on the same output setting as output setting applied to the content S (i.e., the content corresponding to the received identification information) represented by the object S selected by the user. The output setting may refer to a configuration specified for the output device to output the content. The server 200 may retrieve the second content having the same output setting as the output setting of the content S from the content DB 210. For example, when the content S (e.g., a document) selected by the user has been output from the output device 301 under the settings of a color, double-sided printing, or Letter size, the server 200 may retrieve a document, which has been output under the same output setting, from the content DB 210 and may designate, as the second content, at least one of retrieval results, but the disclosure is not limited thereto.

According to another embodiment, the server 200 may designate, as the second content, content included in the same category as the category of the content S (i.e., content corresponding to received identification information) represented by the object S selected by the user. The server 200 may retrieve the content, which belongs to the same category, from the content DB 210. For example, content (e.g., a document) selected by the user may belong to the category of "Project X", but the disclosure is not limited thereto. In this case, the server 200 may retrieve at least one document belonging to the category of "Project X" from the content DB 210 and may designate the retrieval result as the second content.

When the second content is specified as described above, the server 200 may transmit second metadata of the second content to the electronic device 100A-1. The electronic device 100A-1 may visually output the second object representing the second content based on the received second metadata.

Meanwhile, according to various embodiments, the server 200 may include artificial intelligence (AI). For example, the server 200 may select the optimal content to be recommended by analyzing content output histories of various users and content output histories of the output devices, and may specify the recommended content as the first content. In addition, the server 200 may specify, as the second content, the optimal content formally and/or substantially associated with content (i.e., content corresponding to received identification information) represented by an object selected by the user.

According to an embodiment of the disclosure, the server 200 may recommend content (the first content) to a user by using a content output history of the server 200 and a content output history of another electronic device or by using content output histories of output devices specified in various paths. In addition, the server 200 may recommend content (the second content), which is associated with content selected by the electronic device 100A-1, adaptively and/or in real time. The recommendation of the second content may be updated in response to the selection of the user, so the recommendation of the second content may be referred to as a dynamic recommendation and the recommendation of the first content may be referred to as a static recommendation.

Figure 2:
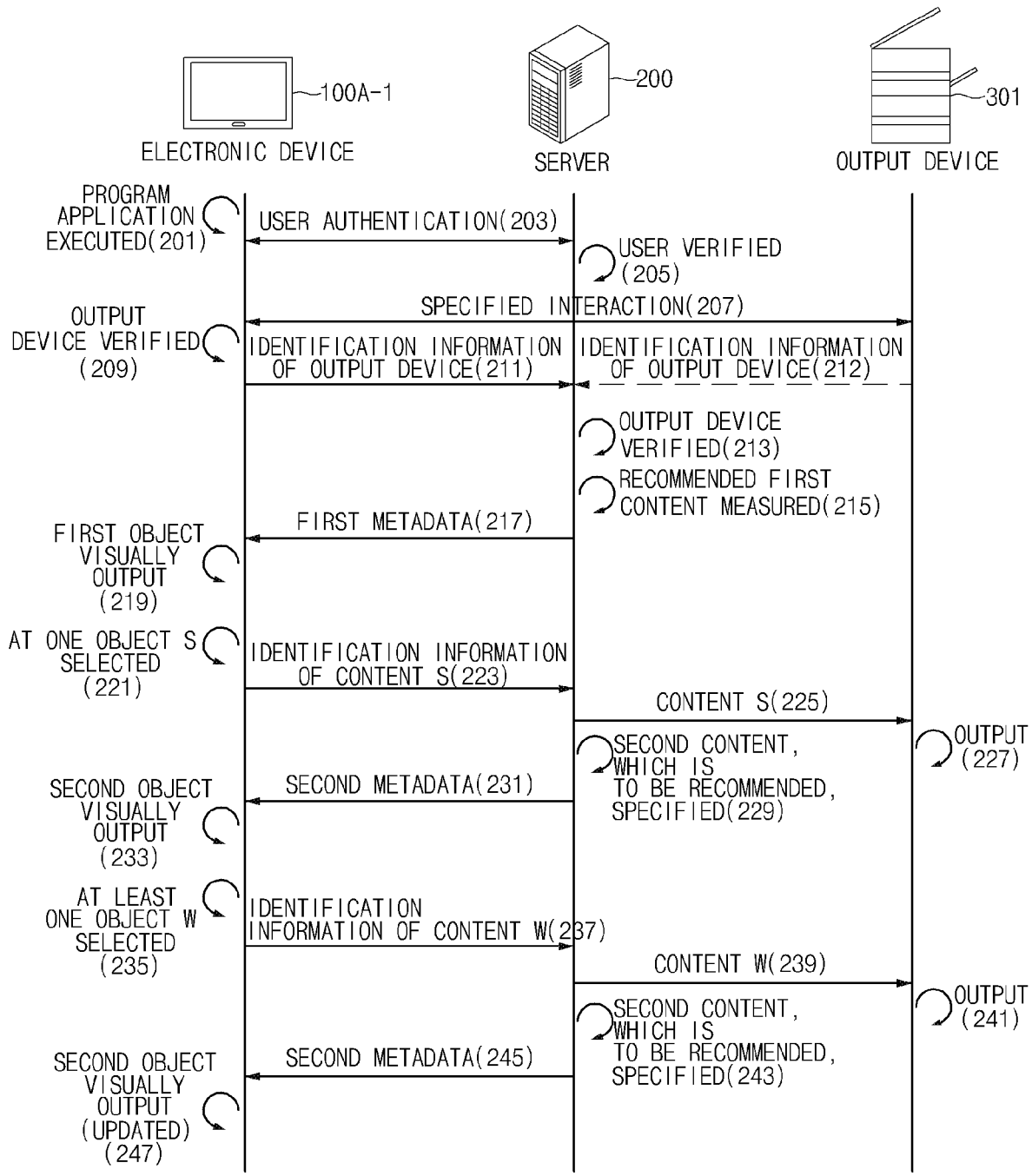
FIG. 2 is a sequence diagram illustrating an operation of a system for recommending content, according to an embodiment.

FIG. 2 is a sequence diagram illustrating an operation of a system for recommending content, according to an embodiment.

Referring to FIG. 2, the operation of the system for recommending content according to one embodiment may include operations 201 to 247. Operations 201 to 247 may be performed, for example, among the electronic device 100A-1, the server 200, and the output device 301 illustrated in FIG. 1. The reference numerals of FIG. 1 will be used in the following description made with reference to FIG. 2.

In operation 201, the electronic device 100A-1 of the user 1 may execute or launch a printing application. The graphic UI of the printing application may be displayed on a display provided in the electronic device by executing the printing application.

Figure 6:
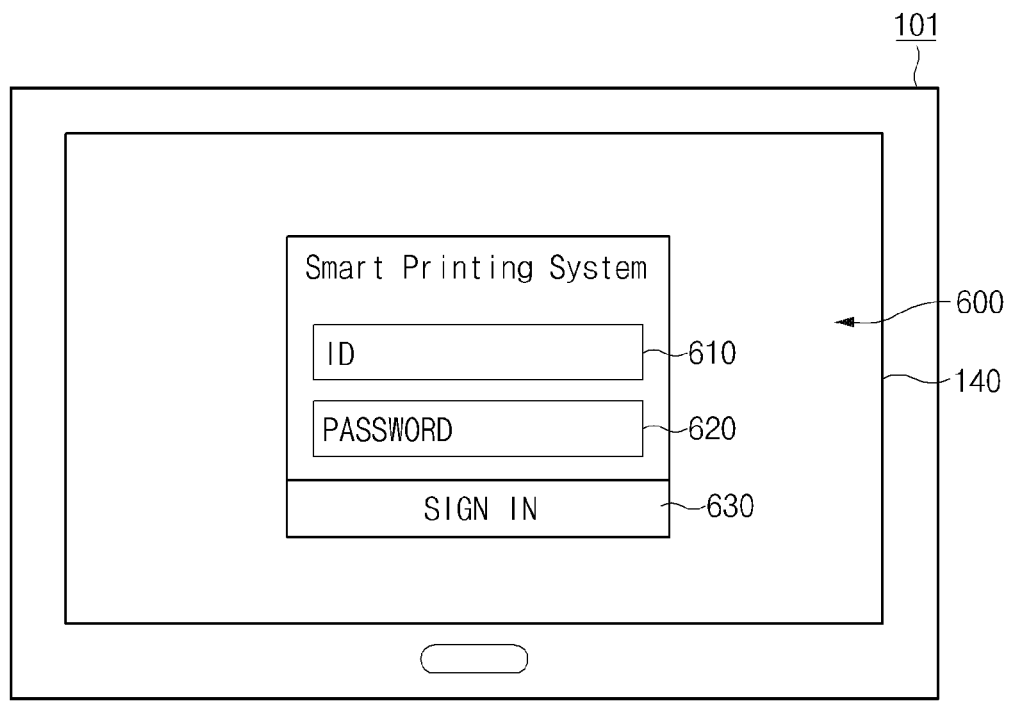
FIG. 6 is a view for explaining user authentication, according to an embodiment.

In operation 203, the electronic device 100A-1 of the user 1 may perform user authentication (e.g., login) with the server 200 (see FIG. 6). For example, the electronic device 100A-1 may obtain authority to access the server 200 from the server 200 based on the input ID and password.

In operation 205, the server 200 may recognize or identify the user when the user authentication for the user 1 is successfully performed.

Figure 7:
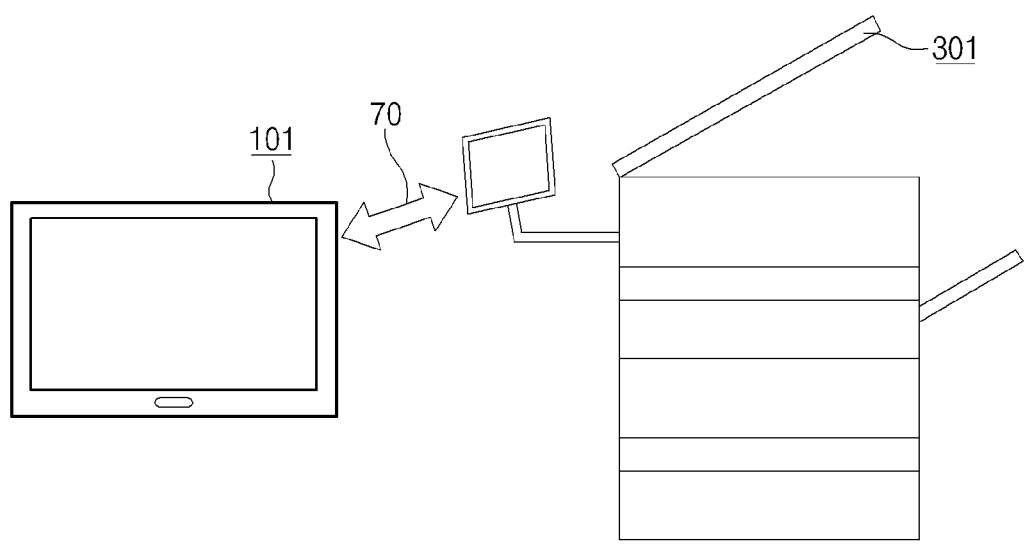
FIG. 7 is a view for explaining an interaction between an electronic device and an output device, according to an embodiment.

In operation 207, the electronic device 100A-1 may perform specified interaction with the output device 301 (see FIG. 7). The output device 301 may be assigned as a device to output the selected content through the interaction. The interaction may include any one of communication based on near field communication (NFC), Bluetooth, or Wi-Fi Direct, quick response (QR) code recognition, or RFID tag recognition. According to various embodiments, the user 1 may directly assign the electronic device 301 using the graphic UI output to the electronic device 100A-1, instead of operation 207.

In operation 209, the electronic device 100A-1 may verify the output device 301 that has performed the interaction in operation 207. For example, the electronic device 100A-1 may obtain the identification information of the output device 301 through the interaction. The electronic device 100A-1 may determine whether a driver for the output device 301 is installed. For example, the identification information may include an address of the output device 301 over the network.

In operation 211, the electronic device 100A-1 may send, to the server 200, the identification information of the output device 301 verified in operation 209.

According to various embodiments, the output device 301, which has performed the interaction in operation 207, may directly transmit the identification information thereof to the server 200 as in operation 212. Thus, operations 211 and 212 may be performed selectively or together.

In operation 213, the server 200 may verify or identify the output device 301 based on the identification information of the output device 301 obtained from the electronic device 100A-1 (or the output device 301).

In operation 215, the server 200 may specify content to be recommended to the user in various following manners.

According to one embodiment, the server 200 may specify the first content based on the information of the user verified in operation 205, that is, the authentication information of the user 1 (operation 203).

For example, the server 200 may specify the first content based on the content output history of the user 1. In detail, the server 200 may specify, as the first content, content periodically output by the user 1, content output by the user 1 at the frequency higher than a specified value, content output by the user 1 within a specified period, or the combination thereof, but the disclosure is not limited thereto.

As another example, the server 200 may specify the first content based on the content output history of another user (i.e., user 2, user 3) belonging to the group (i.e., group A) in common with the user 1. In detail, the server 200 may specify, as the first content, content periodically output by the user 2 or the user 3 belonging to the group A in common with the user 1, content output by the user 2 or user 3 at the frequency higher than a specified value, content output by the user 2 or user 3 within a specified period, or the combination thereof, but the disclosure is not limited thereto.

According to an embodiment, the server 200 may specify the first content, based on content output histories of other users (e.g., user 5) playing roles corresponding to (e.g., the same roles as) the role (e.g., job, position, or the like) of the user 1. In detail, the server 200 may specify, as the first content, content periodically output by the user 5 playing the same role as the role of the user 1, content output by the user 5 at the frequency higher than a specified value, content output by the user 5 within a specified period, or the combination thereof, but the disclosure is not limited thereto.

According to an embodiment, the server 200 may specify the first content based on the identification information of the output device 301 received in operation 211 or operation 212. For example, the server 200 may specify the first content to be recommended to the user 1 based on the content output history of the output device 301 verified in operation 213. In detail, the server 200 may specify, as the first content, content periodically output by the output device 301, content output by the output device 301 at the frequency higher than a specified value, content output by the output device 301 within a specified period, or the combination thereof, but the disclosure is not limited thereto.

According to various embodiments, the server 200 may have artificial intelligence (AI). The server 200 may complexly apply the first content specifying manner based on the AI. Accordingly, the server 200 may recommend the first content, which is optimized to the user, to the user.

In operation 217, the server 200 may transmit the first metadata of the first content specified in operation 215 to the electronic device 100A-1.

Figure 8A:
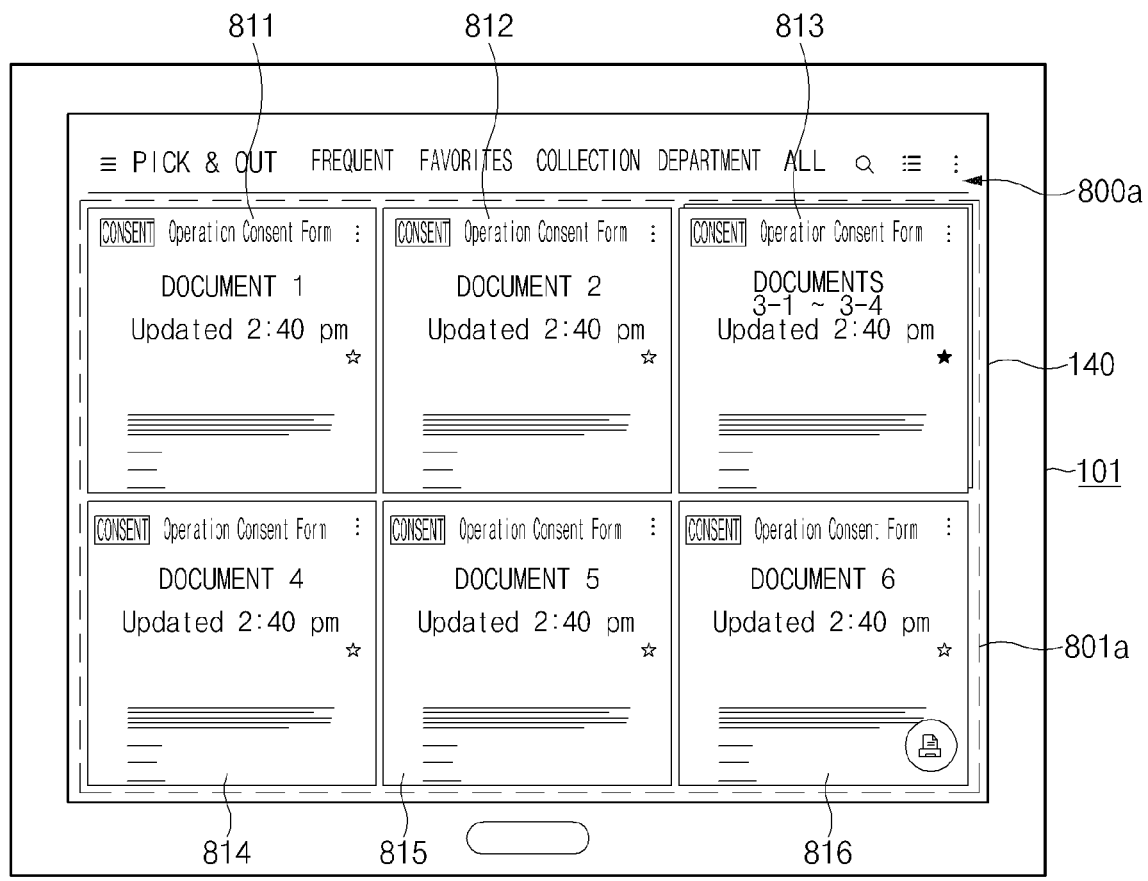
FIGS. 8A and 8B are views for explaining static recommendation content, according to an embodiment.
Figure 8B:
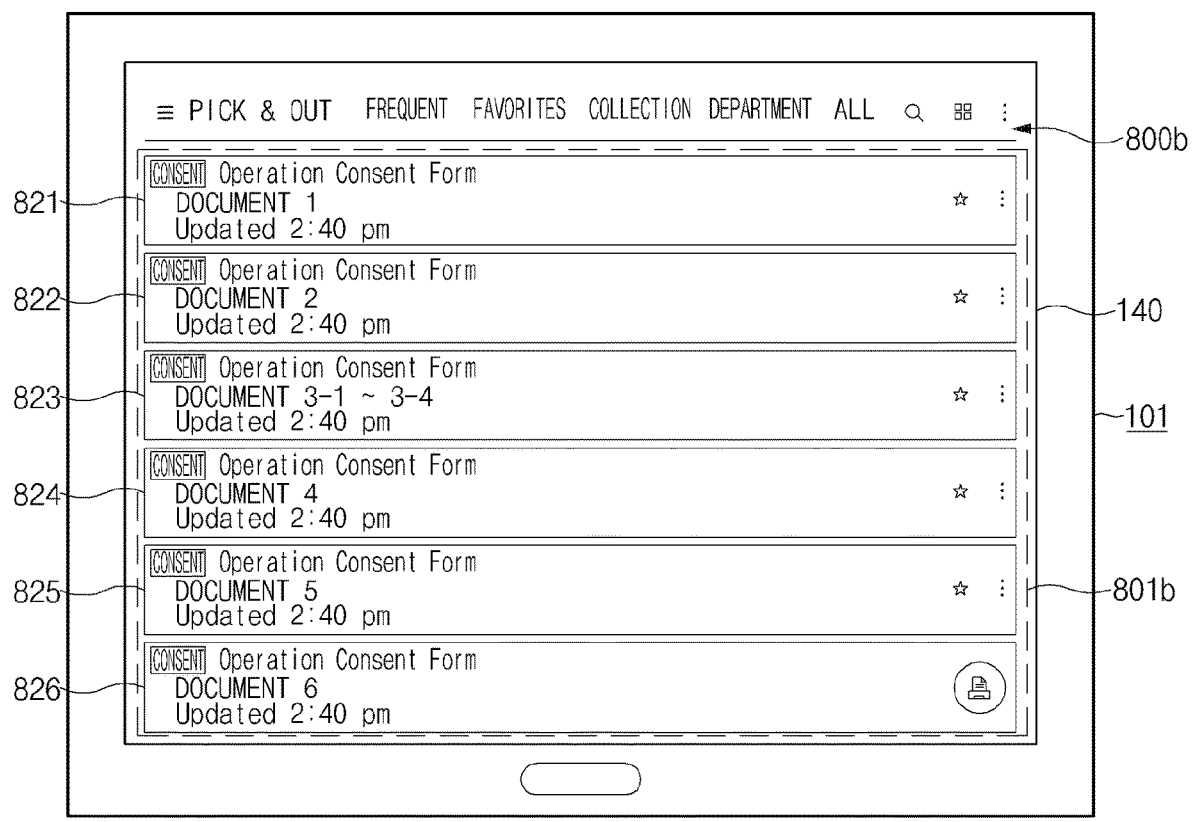

In operation 219, the electronic device 100A-1 may visually output a first object representing the first content based on the first metadata received in operation 217 (see FIGS. 8A and 8B).

Figure 9:
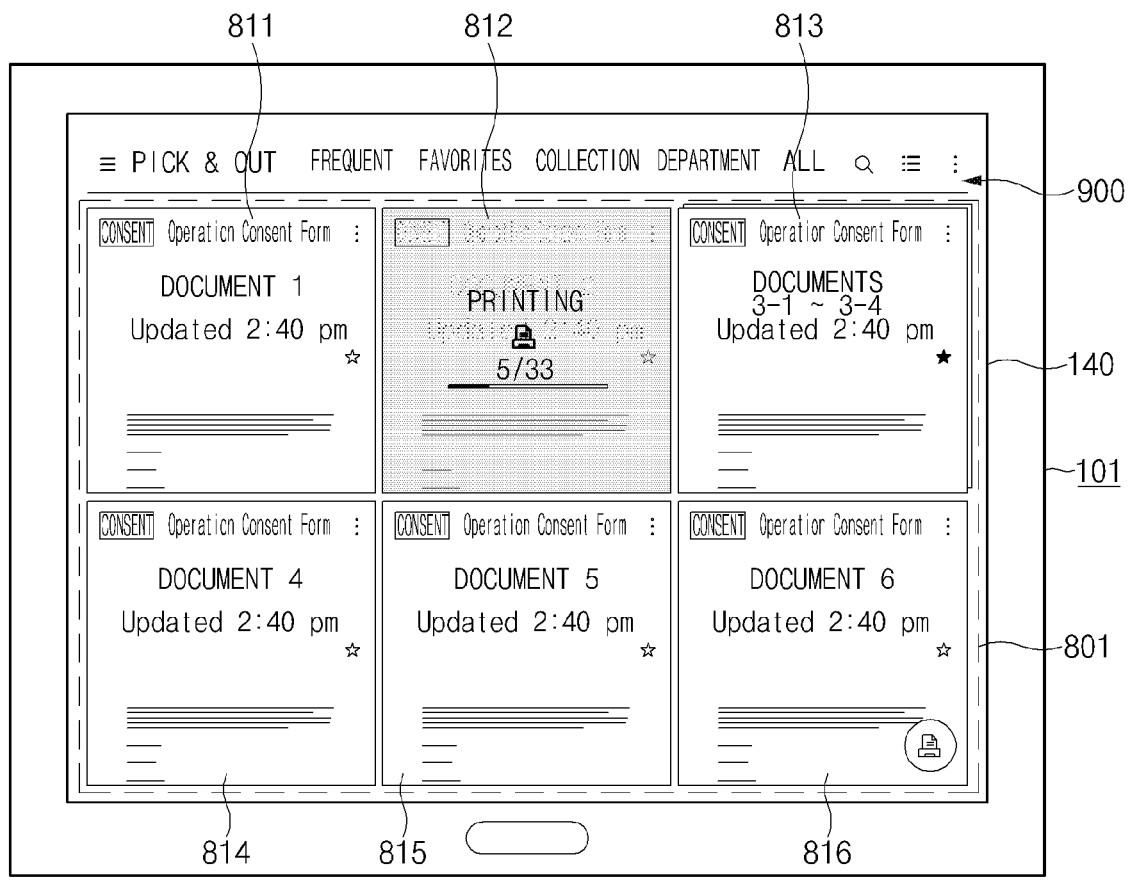
FIG. 9 is a view for explaining the output of content, according to an embodiment.
Figure 10:
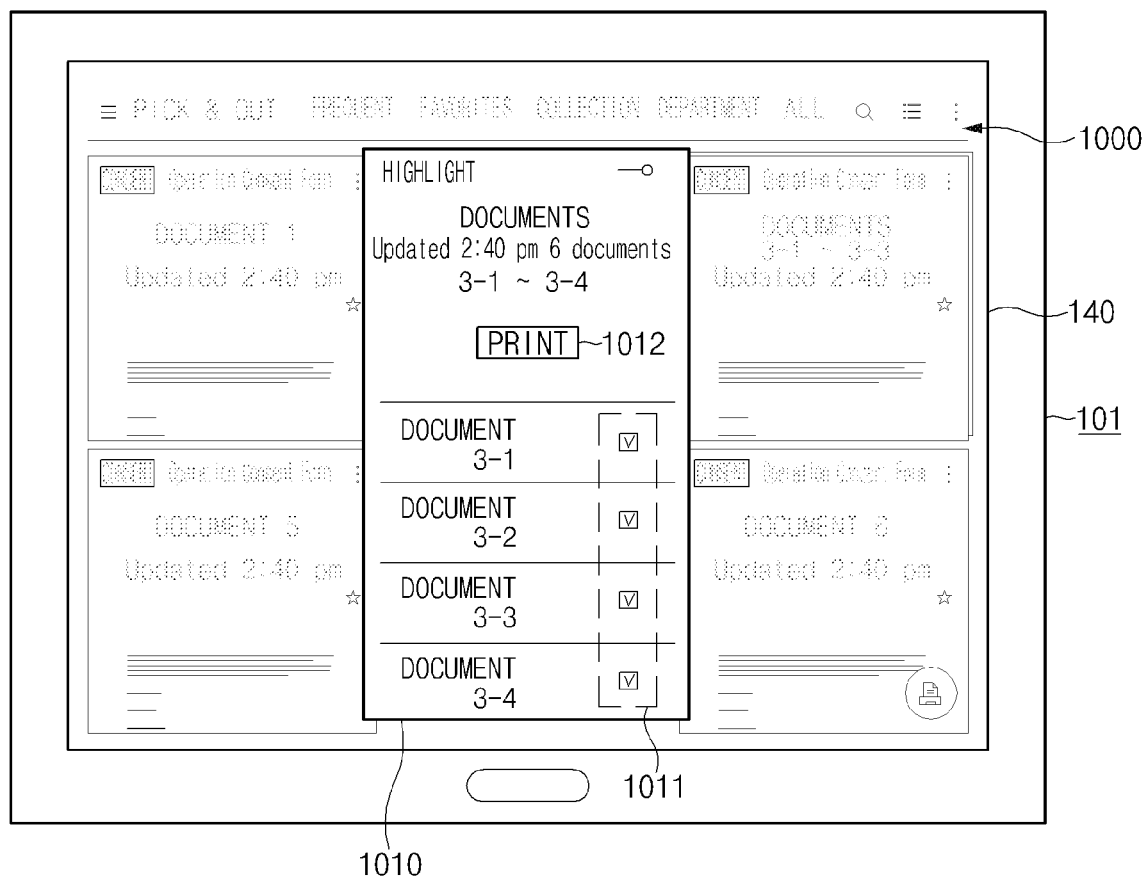
FIG. 10 is a view for explaining the output of content, according to another embodiment.

In operation 221, the electronic device 100A-1 may receive a user input of selecting at least one object S of various objects output to the display (see FIGS. 9 and 10).

In operation 223, the electronic device 100A-1 may transmit, to the server 200, the identification information of content S represented by the object S selected in the operation 221. The identification information of the content S may include, for example, the name of the content S or an address of the content S in the content DB 210.

In operation 225, the server 200 reads the content S, which corresponds to the identification information, out of the content DB 210 of the server 200 based on the identification information of the content S received in operation 223 and then may transmit the content S to the output device 301 verified in operation 213.

In operation 227, the output device 310 may output the content S received in operation 225. For example, when the output device 310 is a printer, the content may be output on paper (hard copy).

In operation 229, the server 200 may specify the second content associated with the content S (the content corresponding to the identification information received in operation 223), in various following manners.

According to one embodiment, the server 200 may specify, as the second content, the content having the output history based on the output setting that is the same as the output setting applied to the content S. For example, when the content S (e.g., a document) has been output in operation 227 under the settings of a color, double-sided printing, or Letter size, the server 200 may retrieve content, which has been output under the same output setting, from the content DB 210 and may specify, as the second content, at least one of the retrieval results, but the disclosure is not limited thereto.

According to another embodiment, the server 200 may specify, as the second content, the content included in the same category as the category of the content S. For example, the content S selected by the user may belong to the category of "Project X", but the disclosure is not limited thereto. In this case, the server 200 may retrieve at least one document belonging to the category of "Project X" from the content DB 210 and may specify the retrieval result as the second content.

Meanwhile, according to various embodiments, the second content is not limited to previous embodiments. For example, the server 200 may retrieve, from the content DB 210, content that is formally and/or substantially associated with the content S based on AI, and may specify the content as the second content. Accordingly, the server 200 may recommend the second content optimized to the user 1.

In operation 231, the server 200 may transmit, to the electronic device 100A-1, the second metadata of the second content specified in operation 229.

Figure 11A:
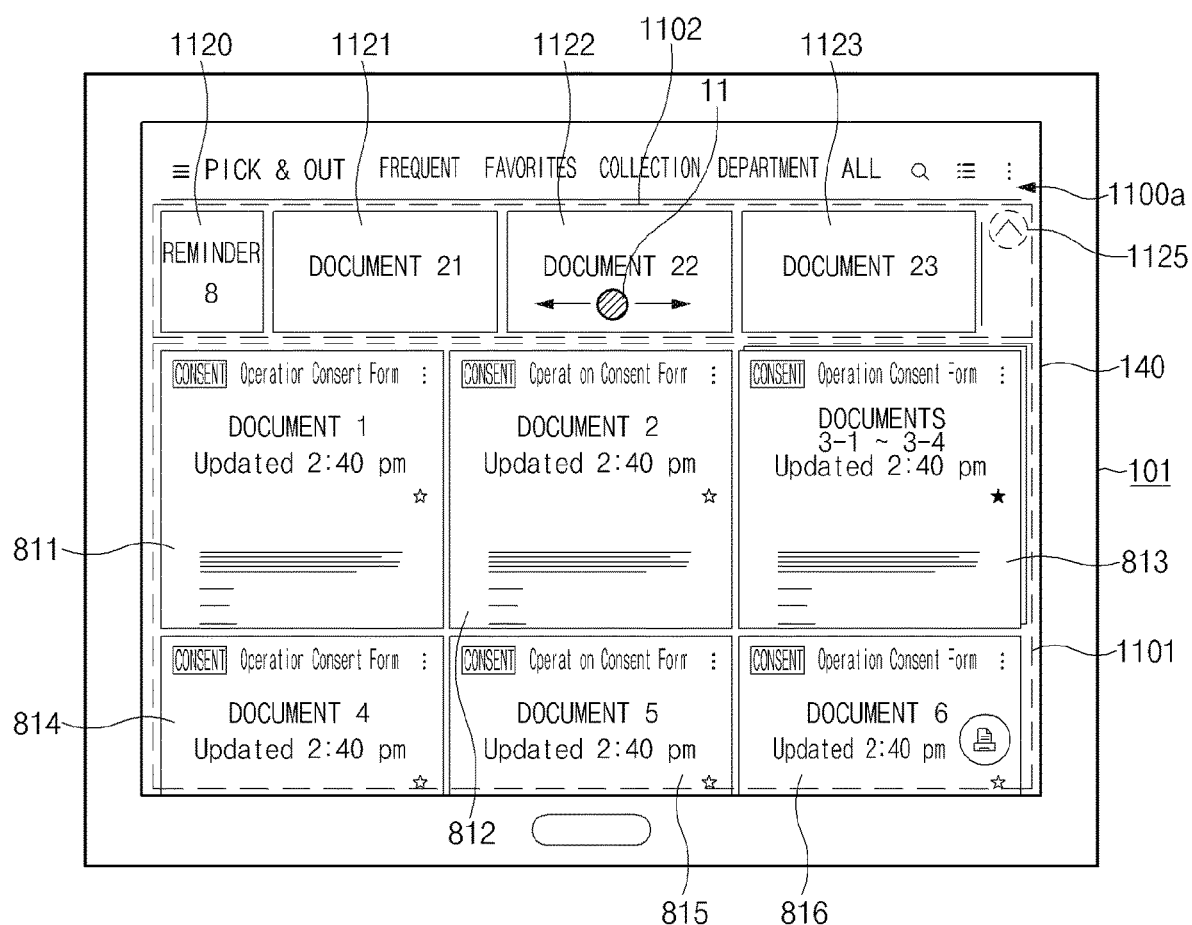
FIGS. 11A and 11B are views for explaining dynamic recommendation content, according to an embodiment.
Figure 11B:
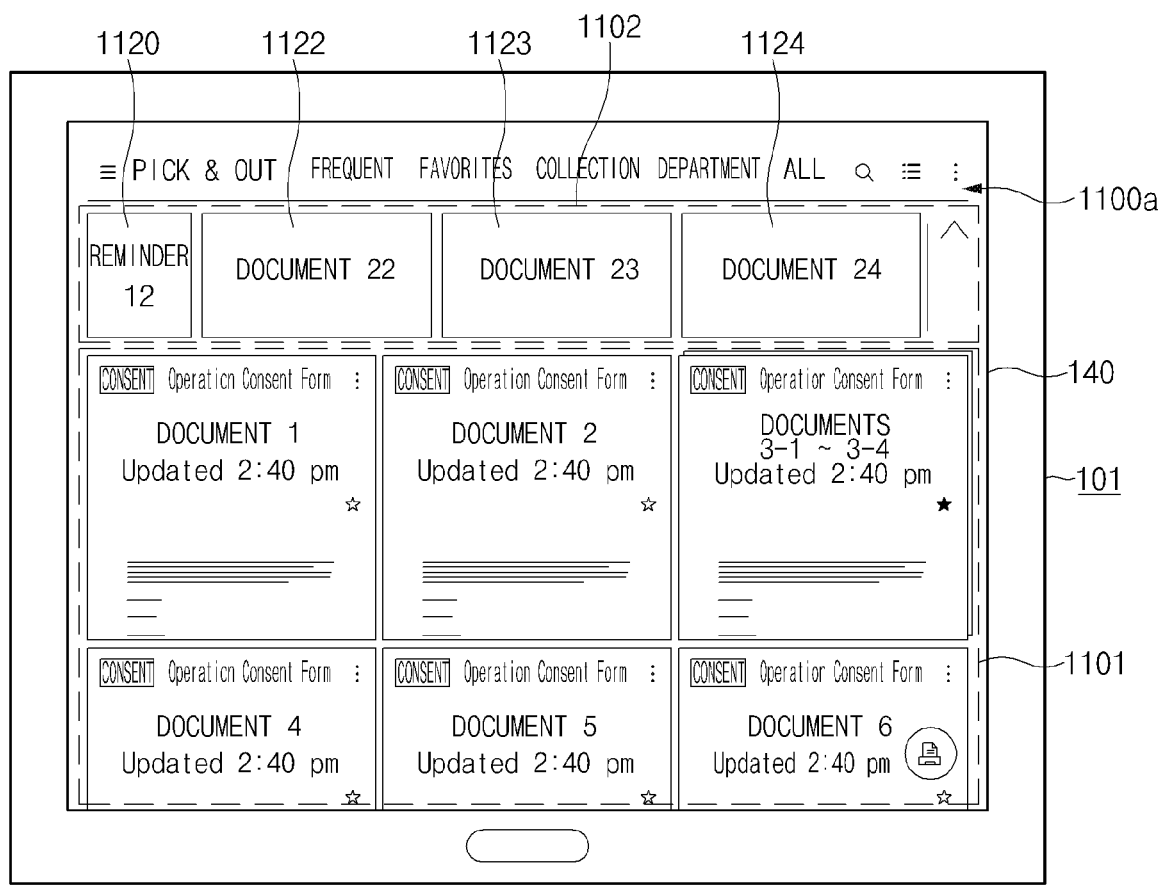

In operation 233, the electronic device 100A-1 may visually output a second object representing the second content based on the second metadata received in operation 231 (see FIGS. 11A and 11B).

In operation 235, the electronic device 100A-1 may receive a user input of selecting at least one object W of various objects output to the display. Hereinafter, operations 237 to 247 are similar to operations 223 to 233, so the redundant details will be omitted. Brief description will be made below.

When the object W is selected in operation 235, the identification information of content W represented by the object W is transmitted to the server 200 (operation 237), and the server 200 outputs the content W corresponding to the identification information through the output device 301 (operations 239 and 241). In addition, the server 200 specifies content (second content) associated with the content W corresponding to the received identification information (operation 243) and transmits the metadata (second metadata) of the content (second content) to the electronic device 100A-1 (operation 245). Accordingly, the second object of the second content output to the electronic device 100A-1 may be updated (operation 247).

Figure 3:
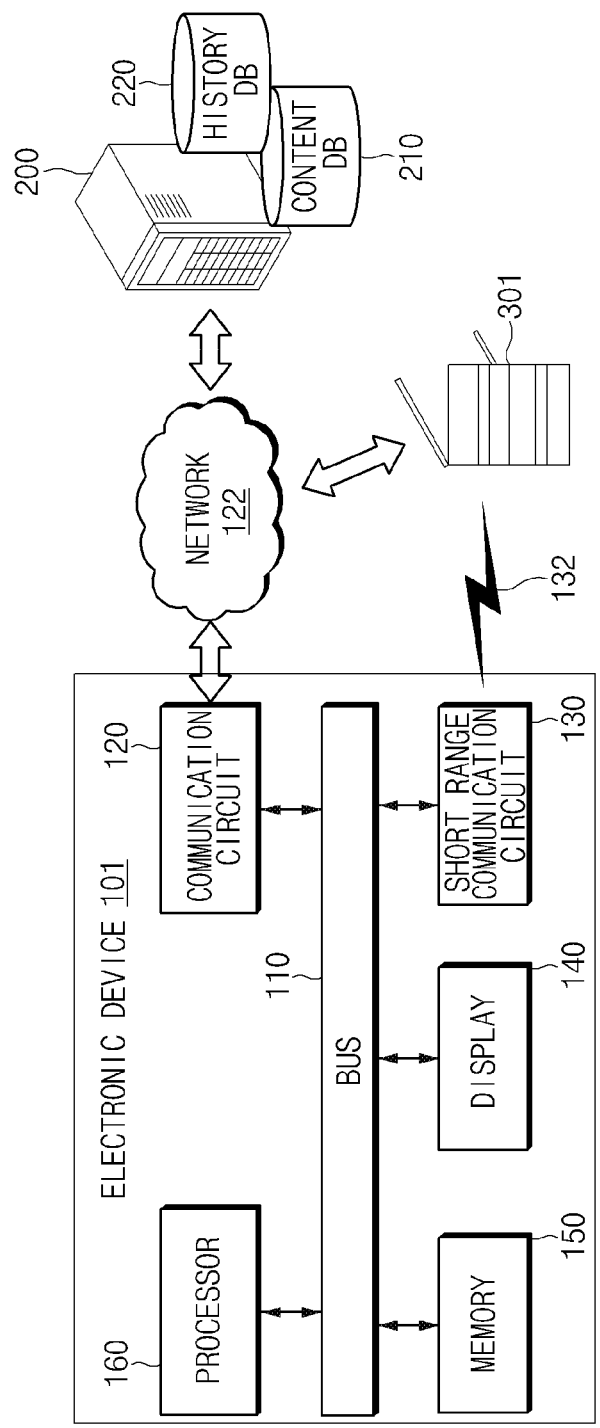
FIG. 3 illustrates a configuration of a system for recommending content, according to an embodiment.

FIG. 3 illustrates a configuration of a system for recommending content, according to an embodiment;

Referring to FIG. 3, according to one embodiment, an output system may include an electronic device 101, the server 200, and the output device 301. According to an embodiment, the electronic device 101 may include a bus 110, a communication circuit 120, a short range communication circuit 130, a display 140, a memory 150, and a processor 170. The electronic device 101 may correspond to various types of electronic devices 100A-1, 100A-2, 100A-3, 100B-1, 100B-2, and 100B-3 illustrated in FIG. 1. In an embodiment, the electronic device 101 may not include at least one of the above-described components or may further include another component (e.g., a camera, various sensors, or the like).

The bus 110 may include, for example, a circuitry that interconnects components 120 to 160 to each other and transmits communication (e.g., control messages, information, and/or data) between components.

The communication circuit 120 may establish communication between the electronic device 101 and an external device (e.g., the server 200 and the output device 301). For example, the communication circuit 170 may be connected to a network 122 via wireless or wired communication to make communication with the external device (e.g., the server 200 or the output device 301). The network 122 may include at least one of a telecommunications network, for example, a computer network (e.g., a LAN or WAN), an intranet, the Internet, a VPN, or a telephone network.

Wireless communication may include cellular communication employing, such as long-term evolution (LTE), LTE-advanced (LTE-A), code division multiple access (CDMA), WCDMA (wideband CDMA), a universal mobile telecommunications system (UMTS), a wireless broadband (Wi-Bro), or a global system for mobile communications (GSM) as a cellular communication protocol.

The wired communication may include, for example, at least one of a universal serial bus (USB), a high definition multimedia interface (HDMI), a recommended standard-232 (RS-232), or a plain old telephone service (POTS).

The short range communication circuit 130 may interact with the output device 301, for example, through short range communication connection 132. The electronic device 101 and the output device 301 may create a specified communication channel to identify each other and perform a specified function through the short range communication connection 132.

The short range communication circuit 130 may include at least one of a (Wi-Fi) Direct module, a Bluetooth module, a Bluetooth low energy (BLE) module, a Zigbee module, an NFC module, a magnetic secure transmission (MST) module, a radio frequency (RF) module, or a body area network (BAN) module.

The display 140 may display, for example, a graphical UI including a text, an image, a video, an icon, a symbol, or the like for the user under the control of the processor 160.

The display 140 may include, for example, a liquid crystal display (LCD), a light-emitting diode (LED) display, an organic LED (OLED), a microelectromechanical systems (MEMS) display, or an electronic paper display.

The display 140 may include a touch screen (or a touch panel) and may receive, for example, a touch, gesture, proximity, or hovering input using an electronic pen or a part of a body of a user.

The memory 150 may include a volatile and/or a non-volatile memory. For example, the memory 150 may store commends or data associated with at least another component(s) of the electronic device 101. According to an embodiment, the memory 150 may store software and/or a program (e.g., a printing application program and instructions configured such that the processor is performed in execution).

The processor 160 may include one or more of a central processing unit (CPU), an application processor (AP), or a communication processor (CP). The processor 160 may, for example, be connected with at least one different component 110 to 150 in the electronic device 101 to perform an operation or data processing associated with the control and/or communication of at least one different component 110 to 150 in the electronic device 101.

According to an embodiment, the processor 160 may perform the operations, which has been described with reference to FIG. 4, when executing instructions stored in the memory 150. In addition, in the disclosure, at least some of operations described as operations of an "electronic device" should be understood as operations of the processor 160.

The server 200 may have components the same as or similar to components of the electronic device 101. For example, the content DB 210 and the history DB for output content 220 may be constructed in a memory embedded in the electronic device 101 or an external memory operatively connected with the electronic device 101. In addition, the processor of the server 200 may perform operations described with reference to FIG. 5 when executed. In addition, in the disclosure, at least some of operations described as operations of a "server" should be understood as operations of a processor mounted on the server 200. According to an embodiment, the server 200 may include a server or a group of two or more servers.

According to another embodiment, when the electronic device 101 executes any function or service automatically or in response to a request, the electronic device 101 may request the server 106 to execute at least some functions associated with the any function or service, instead of executing the any function or service or additionally. The server 200 may execute the requested function or an additional function and may transmit the execution result to the electronic device 101. The electronic device 101 may provide the requested function or service by processing the received result, without change or additionally. To this end, for example, cloud computing, distributed computing, or client-server computing may be used.

The output device 301 may include, for example, an ink-jet printer, a laser printer, an XY plotter, or a three dimension (3D) printer. According to an embodiment, the output device 301 may include a component the same as or similar to a component of the electronic device. For example, the output device 301 may include a processor to control the operation of the output device 301, a memory to store a program, and a communication circuit to access the network 122.

According to an embodiment, the output device 301 may include a component corresponding to the short range communication circuit 130 to establish a short range communication channel with the electronic device 101. For example, the output device 301 may be equipped with an NFC module, a Bluetooth module, a Wi-Fi module, or an RFID tag reader. According to various embodiments, a QR code representing visualized the identification information of the output device may be attached to an outer portion of the output device 301.

Figure 4:
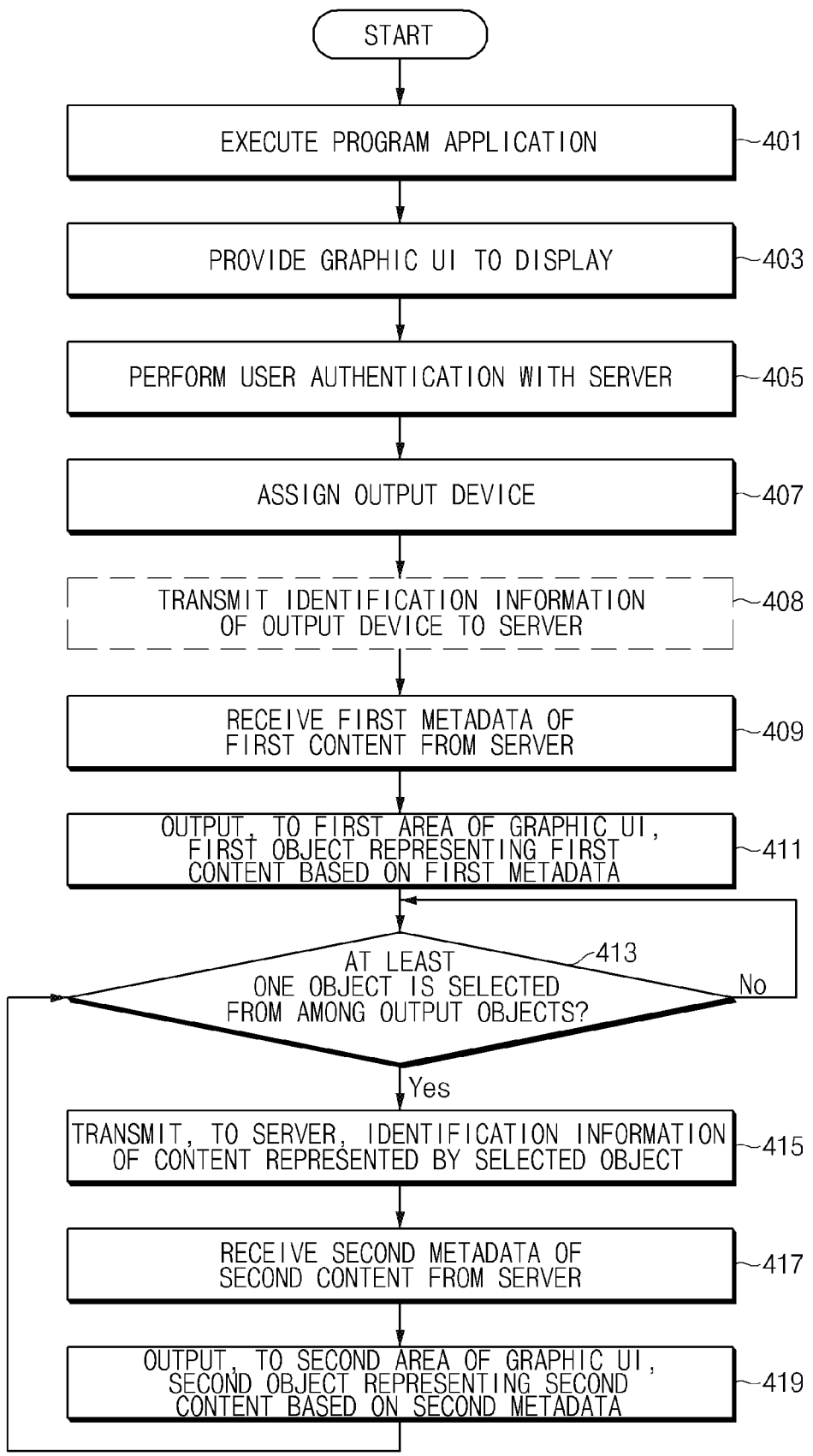
FIG. 4 is a flowchart illustrating an operation of an electronic device, according to an embodiment.

FIG. 4 is a flowchart illustrating an operation of an electronic device, according to an embodiment.

Referring to FIG. 4, a method for controlling the operation of an electronic device according to an embodiment may include operations 401 to 419. Operations 401 to 419 may be performed, for example, by the electronic device 101 illustrated in FIG. 3. Each of operations 401 to 419 may be implemented with an instruction (instructions) that may be executed (or executed) by, for example, the processor 160 of the electronic device 101. The instructions may be stored, for example, in the form of an application program (e.g., a printing application) in a computer recording medium or the memory 150 of the electronic device 101 illustrated in FIG. 3.

Hereinafter, operations 401 to 419 will be described using reference numerals of FIG. 3 together with the description made with reference to FIGS. 6 to 11B for the convenience of explanation.

In operation 401, the processor 160 of the electronic device 101 may execute or launch a printing application.

In operation 403, the processor 160 may output the graphic UI through the display 140 in response to the execution of the printing application.

In operation 405, the processor 160 may perform user authentication (e.g., login) together with the server 200, based on user input through the graphic UI.

For example, referring to FIG. 6, a graphic UI screen 600 for the user authentication may be output to the display 140 of the electronic device 101. The graphic UI screen 600 may include a field 610 for inputting an ID, a field 620 for inputting a password, and a soft button 630 representing a user authentication request. The user of the electronic device 101 may use the system for recommending content according to various embodiments of the disclosure by inputting the ID and the password of the user in the fields 610 and 620, respectively, and selecting the soft button 630.

In operation 407, the processor 160 may assign the output device 301 to output the intended content based on the user input or the output device 301 to output the intended content through interaction 132.

In association with operation 407, referring to FIG. 7, an example of the interaction 132 or 70 between the electronic device 101 and the output device 301 is illustrated. The interaction 70 may include, for example, communication based on NFC, Bluetooth, or Wi-Fi Direct, or RFID tag recognition. In addition, the specified interaction 70 may include QR code recognition using a camera (not illustrated) mounted on the electronic device 101. According to an embodiment, the server 200 may obtain the identification information of the output device 301 through the interaction 70 as described above.

In operation 408, the processor 120 may transmit the identification information of the output device 301 to the server 200 through the communication circuit 120 when the output device 301 is assigned. The operation 408 may be omitted when the output device 301 directly transmits the identification information thereof to the server 200.

In operation 409, the processor 160 may receive the first metadata of the first content, which is static recommendation content, from the server 200 through the communication circuit 120.

In operation 411, the processor 160 may output a first object (e.g., a text, image, thumbnail, or the like) representing the first content, to a first area of the graphic UI displayed on the display 120, based on the first metadata received in operation 409.

According to an embodiment, the first content may include at least one file or file set. Accordingly, the first object output to the first area of the graphic UI may include object(s) representing at least one file or a file set, respectively.

For example, referring to FIG. 8A, according to an embodiment, the electronic device 101 may output a graphic UI screen 800a on a display. The graphic UI screen 800a may, for example, include a first area 801a set to output objects 811, 812, 814, 815 and 816 representing five document files and an object 813 representing one document file set 813. The file or file set represented by the objects 811 to 816 is static recommendation content. The file or file set may constitute a first object. The objects 811 to 816 representing the five document files and one document file set may be arranged in a tile format and output to the first area 801a.

For example, referring to FIG. 8B, according to an embodiment, the electronic device 101 may output a graphic UI screen 800b on a display. The graphic UI screen 800b may, for example, include a first area 801b set to output objects 821, 822, 824, 825 and 826 representing five document files and an object 823 representing one document file set 823. The file or file set represented by the objects 821 to 826 is static recommendation content, which may constitute a first object. The objects 821 to 816 representing the five document files and one document file set may be arranged in a list format and output to the first area 801b.

In operation 413, the processor 160 may determine whether at least one object is selected by the user from among the object(s) output to the display 140. If no object is selected, the processor 160 may continue to monitor whether the user selects an object. If at least one object is selected, the processor 160 may proceed to operation 415.

In operation 415, at least one object is selected, so the processor 160 of the electronic device 101 may send the identification information of content represented by the selected object to the server 200 through the communication circuit 120. The server 200 receiving the identification information may output the content, which corresponds to the identification information, through the assigned output device 301.

For example, the processor 160 of the electronic device 101 may receive a user input of selecting the object 812 representing document set 2 (DOCUMENTS 2) from the graphic UI screen 800a illustrated in FIG. 8A. The electronic device 101 transmits the identification information of the document 2 (DOCUMENT 2) to the server 200 in response to the selection while outputting a graphic UI screen 900 to the display 140 as illustrated in FIG. 9. Referring to the graphic UI screen 900, a notification (e.g., PRINTING) indicating that the document 2 (DOCUMENT 2) is currently being printed out, and a bar representing the progress status of the printing, on the object 812, which represents the document 2 (DOCUMENT 2), may be included in the graphic UI screen 900.

For example, the processor 160 of the electronic device 101 may receive a user input of selecting the object 813 representing document set 3 (DOCUMENTS 3-1 to 3-4) from the graphic UI screen 800a illustrated in FIG. 8A. For example, the document set 3 (DOCUMENTS 3-1 to 3-4) may include a bundle of four documents. For example, when the object 813 is selected, the electronic device 101 may output a graphic UI screen 1000 to the display 140 as illustrated in FIG. 10. Referring to FIG. 10, a pop-up window 1010 may be overlaid and output on the graphic UI screen 1000. In the pop-up window, a check box 1011 may be displayed on the pop-up window to select a document to be printed out from the four documents included in the document set 3 (DOCUMENTS 3-1 to 3-4). The user may select a document to be printed out using the check box 1011, and then press a button 1012. The electronic device 101 may transmit the identification information of the selected document to the server 200 in response to the selection of the button 1012, so the user may obtain the hard copy of the selected document from the output device 301.

When the identification information of the content selected by the user is transmitted to the server 200, in operation 417, the processor 160 may receive the second metadata of the second content, which is the dynamic recommendation content, through the communication circuit 120, in response to the transmission.

In operation 419, the processor 160 may output the second object representing the second content, to the second area of the graphic UI displayed on the display 120, based on the second metadata received in operation 417.

According to an embodiment, the second content may include at least one file or a file set. Accordingly, the second object output to the second area of the graphic UI may include object(s) representing at least one file or a file set, respectively For example, referring to FIG. 11A, according to an embodiment, the electronic device 101 may output a graphic UI screen 1100a on the display 140. The graphic UI screen 1100a may include a first area 1101 and a second area 1102.

The first area 1101 may include objects representing a static recommendation document (first content), for example, the objects 811, 812, 814, 815, and 816 representing five document files and the object 813 representing one document file set 813. The second area 1102 provided adjacent to the first area 1101 may include an object 1120 representing that the number of pieces of dynamic recommendation content (second content) is 8 in total, objects 1121, 1122, and 1123 representing three document files among the eight pieces of dynamic recommendation content, and a functional object 1125.

On the second area 1102, the objects 1121, 1122, and 1123 representing the three document files may be output in a format scrollable in a specified direction (e.g., horizontal direction). Accordingly, the user may perform touch scrolling 11 on the first area 1102. For example, when the user performs the touch scrolling 11 in the left direction, objects of other documents except for the objects 1121, 1122, and 1123 exposed on the second area may be exposed. Meanwhile, according to various embodiments, when the functional object 1125 is selected by the user, the graphic UI screen 800a in FIG. 8A may be returned.

After operation 419 is performed, that is, after the graphic UI screen 1100a illustrated in FIG. 11A is output, operation 413 may be returned. In operation 413 described above, the processor 160 of the electronic device 101 may wait for selection from the user while outputting the graphic UI screen 1100a illustrated in FIG. 11A.

According to an embodiment, the electronic device 101 may receive an input of selecting the object 1121 representing document 21 (DOCUMENT 21) from the graphic UI screen 1100a illustrated in FIG. 11A. The electronic device 101 may send the identification information of the document 21 (DOCUMENT 21) to the server 200 (operation 415) in response to the selection for the object 1121, so the user may obtain a hard copy of the document 21 (DOCUMENT 21) from the output device 301.

Meanwhile, the electronic device 101 may perform operations 417 and 419 again. Accordingly, the electronic device 101 may receive the metadata of the dynamic recommendation content (second content) associated with the output document 21 (DOCUMENT 21), and may update the object of the dynamic recommendation content displayed on the second area 1102.

For example, the electronic device 101 may output a graphic UI screen 900 to the display 140 as illustrated in FIG. 11B. The object of the document 21 (DOCUMENT 21), which has been already output, is removed from the second area 1102, and an object 1124 of document 24 (DOCUMENT 24) having the next priority to the document 23 (DOCUMENT 23) may be exposed to the second area 1102. Meanwhile, the user has already output the document 1102 (DOCUMENT 21), so another document associated with the document 21 (DOCUMENT 21) may be further recommended. Thus, an object 1120 representing the total number of dynamic recommendation content (second content) may indicate 12 increased. In other words, the second objects output to the second area 1102 may be updated adaptively or in real time in response to the selection of the user.

Figure 5:
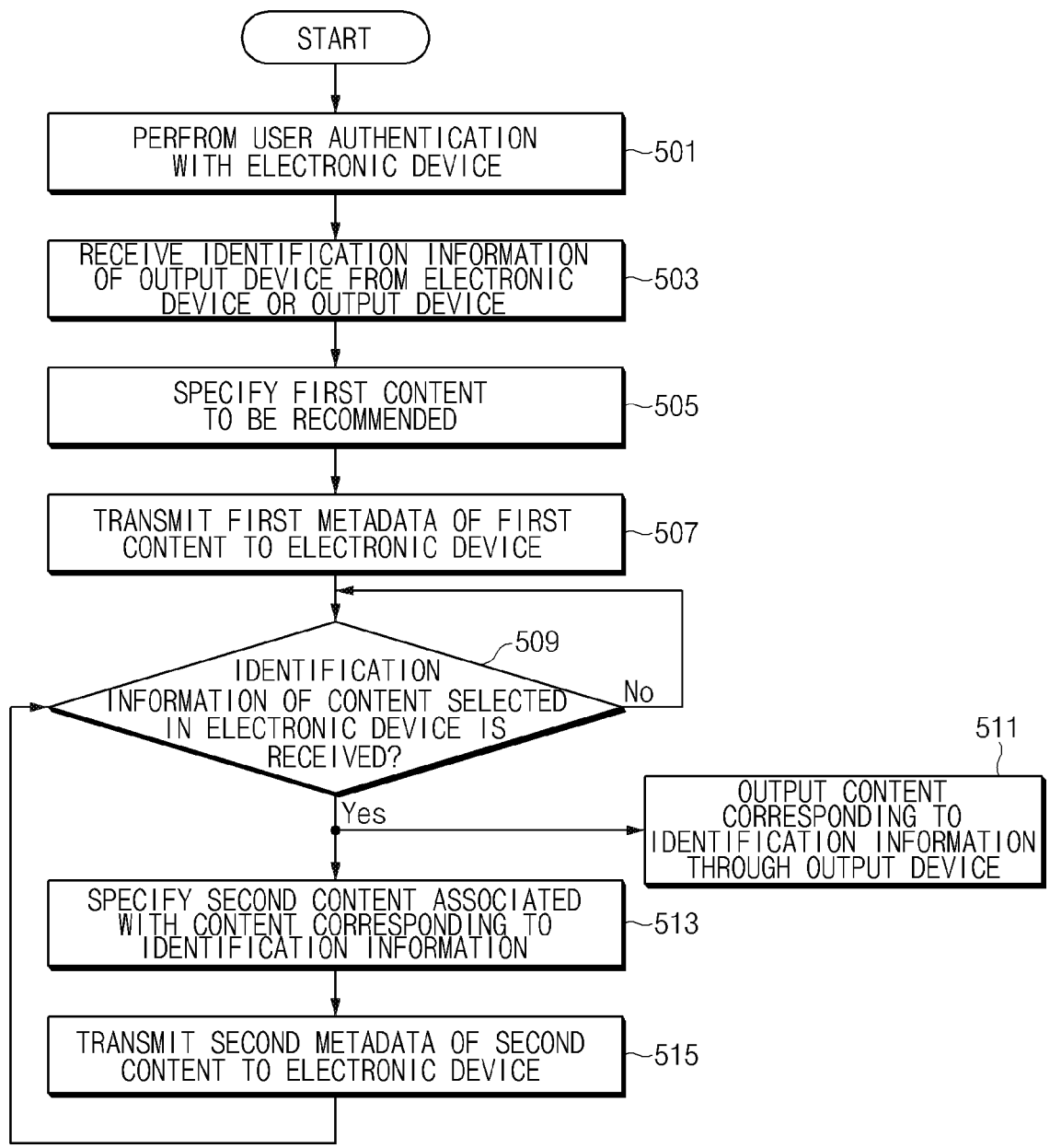
FIG. 5 is a flowchart illustrating an operation of a server, according to an embodiment.

FIG. 5 is a flowchart illustrating an operation of a server, according to an embodiment.

Referring to FIG. 5, according to an embodiment, the operation of the server may include operations 501 to 505. Operations 501 to 515 may be performed, for example, by the server 200 illustrated in FIG. 3. Each of operations 501 to 515 may be implemented with an instruction (instructions) that may be executed (or executed) by, for example, the processor 160 of the server 101. The instructions may be stored in, for example, a computer recording medium, or may be stored in the form of a program in the memory of the server 200. Hereinafter, the description of operation 501 to operation 515 will be made by using reference numerals of FIG. 3.

In operation 501, the server 200 may perform user authentication (e.g., login) together with the electronic device 101.

In operation 503, the server 200 may receive the identification information of the output device 301 from the electronic device 101 or the output device 301.

In operation 505, the server 200 may specify first content to be recommended to the user in various manners. According to an embodiment, the server 200 may specify the first content based on the user authentication made in operation 501. To this end, the server 200 may refer to the content DB 210 and the history DB 220 for output content.

For example, the server 200 may specify the first content based on the content output history of the user using the electronic device 101. As another example, the server 200 may specify the first content based on the content output history of another user belonging to the group in common with the user using the electronic device 101. As another example, the server 200 may specify the first content based on the content output history of other users playing a role (e.g., the same role) corresponding to the role of the user using the electronic device 101.

According to an embodiment, the server 200 may specify the first content based further on the identification information of the output device 301 received in operation 503. For example, the server 200 may specify the first content to be recommended to the user 1 based on the content output history of the output device 301 identified in operation 213.

According to various embodiments, the server 200 may have AI. The server 200 may complexly apply the first content specifying manner based on the AI In operation 507, the server 200 may transmit the first metadata of the first content specified in operation 505 to the electronic device 101.

In operation 509, the server 200 may determine whether the identification information of the content selected in the electronic device 101 is received. When the identification information is not received, whether the identification information of the content selected in the electronic device 101 is received may be monitored by repeating the determination in operation 509. When the identification information is received, the server 200 may perform operation 511 and operation 513.

In operation 513, the server 200 may output the content corresponding to the identification information received in operation 509, that is, the content selected in the electronic device 101, through the output device 301.

In operation 513, the server 200 may specify the second content associated with the content corresponding to the identification information received in operation 509, that is, the content selected in the electronic device 101. To this end, the server 200 may refer to the content DB 210 and the history DB 220 for output content.

For example, the server 200 may specify, as the second content, content having an output history based on the output setting the same as the output setting applied to the content corresponding to the identification information received in operation 509, that is, the content selected in the electronic device 101. As another example, the server 200 specifies, as the second content, another content included in the same category as the category of the content corresponding to the identification information received in operation 509, that is, the content selected in the electronic device 101.

According to various embodiments, the server 200 specifies, as the second content, content formally and/or substantially associated with the content corresponding to the identification information received in operation 509 based on AI.

In operation 515, the server 200 may transmit, to the electronic device 101, the second metadata of the second content specified in operation 513. Thereafter, the server 200 may return to operation 509 and may perform operation 511 to operation 515 again when receiving the identification information of the content selected in the electronic device 101.

According to embodiments of the disclosure, the electronic device may receive the recommendation of the first content based on the content output history of the user, the content output history of another user, and/or the content output history of the specified printer. The user may receive the additional recommendation of the second content that is formally or substantially similar to the content selected by the user.

Accordingly, in a system having a server in which a DB having a huge amount of content is constructed, when the user retrieves specific content from the DB and repeatedly outputs the content, the electronic device may significantly conveniently recommend the more promising similar content. In addition, there is required only that a user goes to the closest printer and simply interacts with the printer. Accordingly, the convenience of the user may be increased.

Therefore, the disclosure may be useful to a nurse or a doctor who has to output a document (e.g., a surgery consent, hospitalization information, or the like), which is previously written, to provide the document to a plurality of patients and has to frequently move inside a hospital. In addition, the disclosure may be useful to attorneys at law firms with multiple lawsuits, insurance planners who need to provide documents to multiple customers, and engineers at construction sites where multiple drawings are used.

According to an embodiment, a system includes an electronic device, a server, and an output device. The electronic device may perform user authentication together with the server. The server may specify first content based on the user authentication and may transmit first metadata of the first content to the electronic device. The electronic device may visually output a first object representing the first content based on the first metadata, and may transmit, when at least one object is selected from the output object by a user, identification information of content represented by the selected object to the server. The server may output the content corresponding to the identification information through the output device.

According to an embodiment, the server may specify the first content based on a content output history of the user who has undergone the user authentication.

According to an embodiment, the server may specify, as the first content, content periodically output by the user, content output by the user at a frequency higher than a specified value, content output by the user within a specified period, or combination thereof.

According to an embodiment, the server may specify the first content based on a content output history of different users belonging to a group in common with the user who has undergone the user authentication, or playing a role corresponding to a role of the user.

According to an embodiment, the server may specify, as the first content, content periodically output by the different users, content output by the different users at a frequency higher than a specified value, content output by the different users within a specified period, or combination thereof.

According to an embodiment, the output device may be assigned by the electronic device or assigned by interaction between the electronic device and the output device.

According to an embodiment, the interaction between the electronic device and the output device may include any one of communication based on near field communication (NFC), Bluetooth, or Wi-Fi Direct, quick response (QR) code recognition, or RFID tag recognition.

According to an embodiment, the server may further obtain identification information of the assigned output device from the electronic device or the assigned output device, and specify the first content based further on the identification information of the assigned output device.

According to an embodiment, the server may specify the first content based on a content output history of the assigned output device According to an embodiment, the server may specify, as the first content, content periodically output by the assigned output device, content output by the assigned output device at a frequency higher than a specified value, content output by the assigned output device within a specified period, or combination thereof.

According to an embodiment, the server may specify second content associated with the content corresponding to the identification information and may transmit second metadata of the second content to the electronic device. The electronic device may further visually output a second object representing the second content, based on the second metadata.

According to an embodiment, the server may specify, as the second content, content output based on the same output setting as output setting applied to the content corresponding to the identification information.

According to an embodiment, the server may specify, as the second content, content included in the same category as a category to which the content corresponding to the identification information belongs.

According to an embodiment, an electronic device may include a memory, a display, a communication circuit to establish communication with a server, and a processor electrically connected with the memory, the display, and the communication circuit. The memory may store instructions that when executed, cause the processor to provide a graphic user interface (UI) to the display, perform user authentication together with the server, receive first metadata of first content from the server, output a first object representing the first content to a first area of the graphic UI based on the first metadata, and transmit, when at least one object is selected of the output object by a user, identification information of content represented by the selected object to the server.

According to an embodiment, the memory may further store an instruction that causes the processor to transmit, when an output device to output the content represented by the selected object is assigned by the user or assigned through interaction with the output device, identification information of the assigned output device to the server.

According to an embodiment, the first content may include at least one file or file set, and the first object includes objects representing the at least one file or file set. The objects may be output in a tile format or list format to the first area According to an embodiment, the first object may include at least one of a text, an image, a moving picture, or a thumbnail of the first content.

According to an embodiment, the memory may further include an instruction that, when executed, causes the processor to receive second metadata of second content from the server in response to the transmission of the identification information and output a second object representing the second content to a second area of the graphic UI based on the second metadata.

According to an embodiment, the second content may have the same output setting as output setting of the selected content or may be included in the same category as a category to which the selected content belongs.

According to an embodiment, the second content may include at least one file or file set, and the second object may include eat least one object representing the at least one file or file set, and At least one of the objects is output in a scrollable format to the second area.

At least a part of an electronic device (e.g., modules or functions thereof) or a method (e.g., operations) according to various embodiments may be, for example, implemented by instructions stored in a computer-readable storage media in the form of a program module. The instruction, when executed by a processor (e.g., the processor 160), may cause the one or more processors to perform a function corresponding to the instruction. The computer-readable storage media, for example, may be the memory 150.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A system comprising:
an electronic device;
a server; and
an output device,
wherein the electronic device provides a graphic user interface (UI) for a user authentication to a display, in response to an execution of a printing application,
wherein the electronic device performs the user authentication together with the server, based on user input through the graphic user interface,
wherein the server specifies first content based on the user authentication, a content output history of a user who has undergone the user authentication or different users belonging to a group in common with the user or playing a role corresponding to a role of the user, and transmits first metadata of the first content to the electronic device,
wherein the electronic device visually outputs a first object, representing the first content and including a first plurality of objects, to at least a portion of the graphic UI based on the first metadata, and transmits, when at least one object is selected from the output object by the user, identification information of content represented by the selected object to the server,
wherein the server outputs content corresponding to the identification information through the output device, specifies content has the same output setting or included in the same category as the content represented by the selected object as second content, and transmits second metadata of the specified second content to the electronic device,
wherein the electronic device receives the second metadata from the server and outputs a second object, representing the second content and including the first plurality of objects in a first area and a second plurality of objects in a second area,
wherein the electronic device transmits, in response to user input selecting an object from the second plurality of objects in the second area, identification information of content presented by the selected object to the server,
wherein the server outputs content corresponding to the identification information through the output device, re-specifies the second content, and transmits second metadata of the re-specified second content to the electronic device,
wherein the electronic device updates the output second object based on the second metadata of the re-specified second content,
wherein the updating includes removing the selected object which has been already output from the second area, and displaying an object of content having the next priority to the content represented by the selected object and an object of content associated with the content represented by the selected object,
wherein the first metadata is a static recommendation content and the second metadata is a dynamic recommendation content, and
wherein the first plurality of objects represents the static recommendation content and the second plurality of objects represents the dynamic recommendation content.

2. The system of claim 1, wherein the server specifies, as the first content, content periodically output by the user, content output by the user at a frequency higher than a specified value, content output by the user within a specified period, or combination thereof.

3. The system of claim 1, wherein the server specifies, as the first content, content periodically output by the different users, content output by the different users at a frequency higher than a specified value, content output by the different users within a specified period, or combination thereof.

4. The system of claim 1, wherein the output device is assigned by the electronic device or assigned by interaction between the electronic device and the output device.

5. The system of claim 4, wherein the interaction between the electronic device and the output device includes one of communication based on near field communication (NFC), Bluetooth, or Wi-Fi Direct, quick response (QR) code recognition, or RFID tag recognition.

6. The system of claim 4, wherein the server:
further obtains identification information of the assigned output device from the electronic device or the assigned output device, and
specifies the first content based further on the identification information of the assigned output device.

7. The system of claim 4, wherein the server specifies the first content based on a content output history of the assigned output device.

8. The system of claim 7, wherein the server specifies, as the first content, content periodically output by the assigned output device, content output by the assigned output device at a frequency higher than a specified value, content output by the assigned output device within a specified period, or combination thereof.

9. An electronic device comprising:
a memory;
a display;
a communication circuit to establish communication with a server; and
a processor electrically connected with the memory, the display, and the communication circuit,
wherein the memory stores instructions that when executed, cause the processor to:
provide a graphic user interface (UI) for a user authentication to the display, in response to an execution of a printing application;
perform the user authentication together with the server, based on user input through the graphic user interface;
when an output device is assigned based on interaction or the user input, transmit identification information of the assigned output device to the server through the communication circuit;
receive first metadata of first content from the server, wherein the first content is specified based on a content output history of a user who has undergone the user authentication or different users belonging to a group in common with the user or playing a role corresponding to a role of the user;

output a first object, representing the first content and including a first plurality of objects, to at least a portion of the graphic UI based on the first metadata;

transmit, when at least one object is selected from the output object by a user, identification information of content represented by the selected object to the server;

receive second metadata of second content from the server, wherein content has the same output setting or included in the same category as the content represented by the selected object is specified as the second content;

output a second object, representing the second content and including the first plurality of objects in a first area and a second plurality of objects in a second area;

transmit, in response to user input selecting an object from the second plurality of objects in the second area, identification information of content presented by the selected object to the server;

receive second metadata of re-specified second content; and update the output second object based on the second metadata of the re-specified second content, wherein the updating includes removing the selected object from the second area, and displaying an object of content having the next priority to the content represented by the selected object and an object of content associated with the content represented by the selected object, wherein the first metadata is a static recommendation content, and the second metadata is a dynamic recommendation content, and wherein the first plurality of objects represents the static recommendation content, and the second plurality of objects represents the dynamic recommendation content.

10. The electronic device of claim 9, wherein the first content includes at least one file or file set, wherein the first plurality of objects includes an object representing the at least one file or file set, and wherein the first plurality of objects is output in a tile format or list format to the at least the portion.

11. The electronic device of claim 9, wherein the first object includes at least one of a text, an image, a moving picture, or a thumbnail of the first content.

12. The electronic device of claim 9, wherein the second content includes at least one file or file set, wherein the second plurality of objects includes an object representing the at least one file or file set, and wherein the second plurality of objects is output in a scrollable format to the second area.

* * * * *